United States Patent [19]

Hoshino et al.

[11] Patent Number: 5,300,764
[45] Date of Patent: Apr. 5, 1994

[54] TRANSPARENT OPTICAL IDENTIFICATION LABEL WITH INFRARED DIRECTIVITY

[75] Inventors: Hidekazu Hoshino; Itsuo Takeuchi, both of Kanagawa, Japan

[73] Assignee: NHK Spring Company, Ltd., Japan

[21] Appl. No.: 826,337

[22] Filed: Jan. 27, 1992

[30] Foreign Application Priority Data
Sep. 11, 1991 [JP] Japan .................. 3-259636

[51] Int. Cl.$^5$ .............. G06K 7/10; B42D 15/00; G02B 27/38
[52] U.S. Cl. ..................... 235/487; 283/86; 283/91; 356/71; 359/2; 235/468
[58] Field of Search ............ 235/487, 468; 356/71; 359/2; 283/86, 91

[56] References Cited

U.S. PATENT DOCUMENTS 3,536,894  10/1970  Travioli ..................... 235/468
4,034,211  7/1977   Horst et al. ................ 235/487
4,501,439  2/1985   Antes ........................ 356/71
4,856,857  8/1989   Takeuchi et al. ............ 283/86

FOREIGN PATENT DOCUMENTS 61-182580  5/1985  Japan .
4934       1/1989  Japan ................... 235/487
3-71383    8/1989  Japan .

*Primary Examiner*—John Shepperd
*Attorney, Agent, or Firm*—Skjerven, Morrill, MacPherson, Franklin & Friel

[57] ABSTRACT

An optical identification label consisting of an area of hologram or diffraction grating which is transparent to visible light but reflects incident light with a specific reflective directivity. By identifying the reflectivity directivity, it is possible to identify the authenticity of the label and, hence, the object to which the identification label is affixed. The fact that the identification label is transparent to human eyes offers a strong discouraging effect on potential forgers. Further, the pattern of the reflected light may be used as means for encoding data.

6 Claims, 4 Drawing Sheets

TRANSPARENT OPTICAL IDENTIFICATION LABEL WITH INFRARED DIRECTIVITY

TECHNICAL FIELD

The present invention relates to an optical identification label which is transparent to human eyes but has a specific optical property which can be identified with optical means.

BACKGROUND OF THE INVENTION

Conventionally is known the structure in which hologram which is difficult to duplicate is affixed as an identification label to objects such as magnetic cards and other information storage cards, stocks and bonds, tickets, and other commercial goods to identify their authenticity, and such a label is disclosed, for instance, in Japanese utility model laid-open publication (kokai) No. 61-182580.

However, such an identification label is necessarily affixed to a location which can be readily and visually identified because it is required to be visually identified. Therefore, the freedom of the design of the object tends to be reduced because the position, shape and color of the identification label must be considered as a part of the design, and the external appearance of the object may be seriously impaired because of the failure to achieve an acceptable design balance.

According to the disclosure of Japanese patent laid-open publication (kokai) No. 3-71383 by the applicant of this patent application, a hologram area having a unique diffraction property is provided on the surface of an object, and this hologram area is identified with an identification unit serving as optical identification means. By using this structure, since the object consists of an object having a fixed shape, such as information storage cards, stocks and bonds, and tickets, and the identification process is carried out by the identification unit, it is possible to place an identification label at an inconspicuous location on the object and to improve the freedom in the design of the object, but the very existence of the identification label on the surface of the object could not totally eliminate the restriction on the design of the object.

Meanwhile, as for the system in which the identification process is carried out with a machine, since the operator is not required to heed the location at which the identification label is placed, it is preferable to make the visual recognition of the existence of the identification label difficult as much as possible to the end of discouraging any attempt to duplicate the identification label with an fraudulent intent.

BRIEF SUMMARY OF THE INVENTION

In view of such problems of the prior art, a primary object of the present invention is to provide an optical identification label which would not affect the external appearance of the object to which the label is affixed.

A second object of the present invention is to provide an optical identification label which is difficult to fabricate for potential forgers.

A third object of the present invention is to provide an optical identification label which ensures accurate and reliable identification.

These and other objects of the present invention can be accomplished by providing a transparent optical identification label, comprising a reflective layer which transmits visible light but reflects light of a certain wavelength other than visible light with a specific directivity that can be identified with optical identifying means. Such a reflective directivity may be produced by using hologram or diffraction grating.

Also, such an wavelength selectivity may be produced in the reflective layer by alternately laminating layers of two or more kinds of different materials having different refractive indices to form the reflective layer.

The identification label of the present invention may be conveniently used as means for preventing an unauthorized duplication of an object to which the identification label is affixed. Further, data may be encoded in the geometrical pattern of the reflected light so that the identification label may be used as an information carrier.

According to such a structure, since visible light is not reflected by the light reflecting layer or, in other words, the light reflecting layer is transparent to human eyes, the identification label would not affect the design of the object in any way. Since the position of the identification label cannot be easily visually determined, forgery of the identification label is rendered highly difficult.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
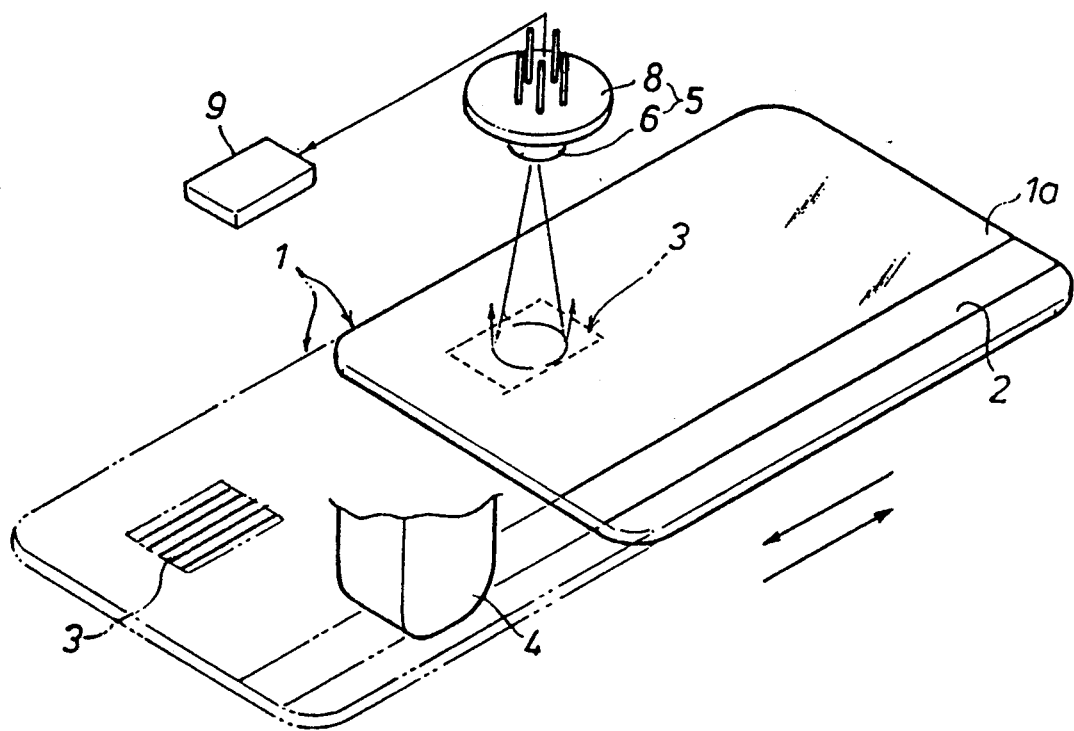
FIG. 1 is a perspective view of a card, and an essential part of the structure for identifying the authenticity of the card.

FIGS. 1 through 4 show an embodiment of the present invention applied to a magnetic card given here as an example of information storage card. Referring to FIG. 1, a magnetic stripe 2 extends longitudinally on a surface 1a of the card 1. The surface 1a is also provided with an identification label 3 serving as a light reflecting part and having a hologram layer given with a specific reflective directivity as described hereinafter.

Figure 2:
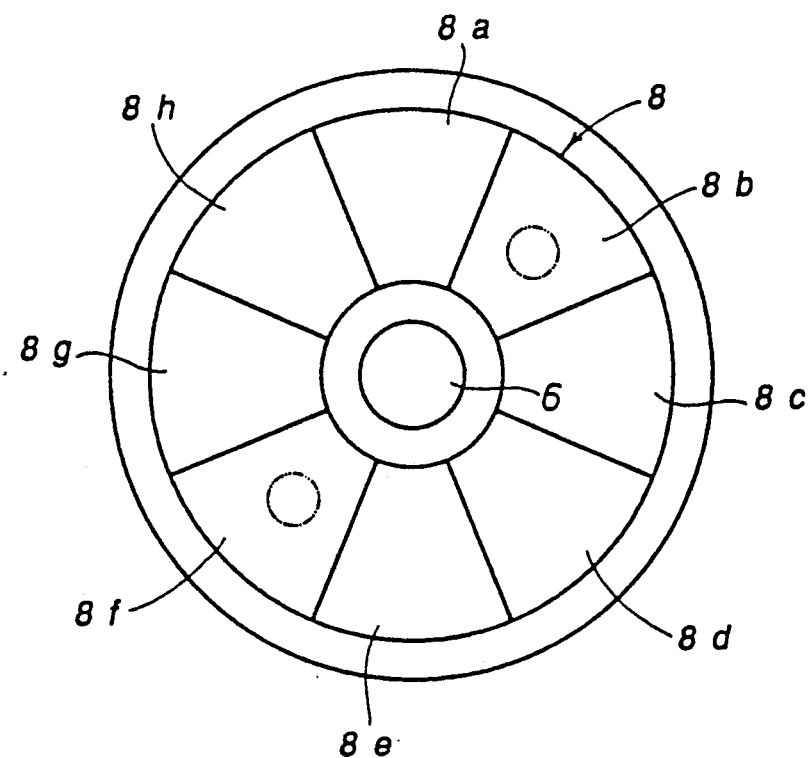
FIG. 2 is a plan view of a light emitting device and a light receiving device.

Meanwhile, a magnetic head 4 is provided in a reader/writer of the card 1 which opposes the magnetic stripe 2 when the card 1 is conveyed by a conveyer unit not shown in the drawings. Also provided is a light emitting/receiving unit 5 so as to oppose the identification label 3 when the card 1 is conveyed. This light emitting/receiving unit 5 consists of a light emitting device 6 for projecting an illuminating laser light beam upon the identification label 3 on the surface 1a of the card 1, and an annular light receiving device 8 surrounding the light emitting device 6 as illustrated in FIG. 2. The light emitting device 6 directly opposes the identification label 3 when the card 1 is at a certain prescribed position. The light receiving device 8 consists of a multi-section photodiode which is divided into eight sectors 8a through 8h which can individually detect light. This light receiving device 8 is connected to a determination unit 9 which consists of known CPU, memory, I/F and other components for determining the authenticity of the card 1.

Figure 3:
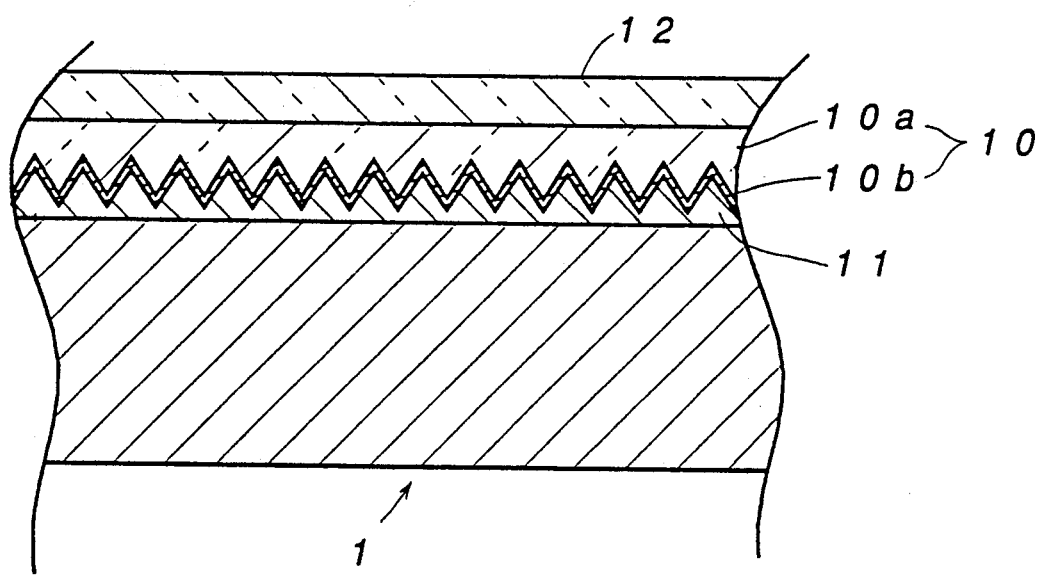
FIG. 3 is an enlarged sectional view of the identification label.

As best illustrated in FIG. 3, the identification label 3 comprises a hologram layer 10 consisting of a hologram forming layer 10a and a light reflecting layer 10b disposed under the hologram forming layer 10a, a bonding agent layer 11 for integrally retaining the hologram layer 10 and securely attaching it to the surface 1a of the card 1, and a protective layer 12 covering the outer surface of the hologram layer 10.

Figure 4:
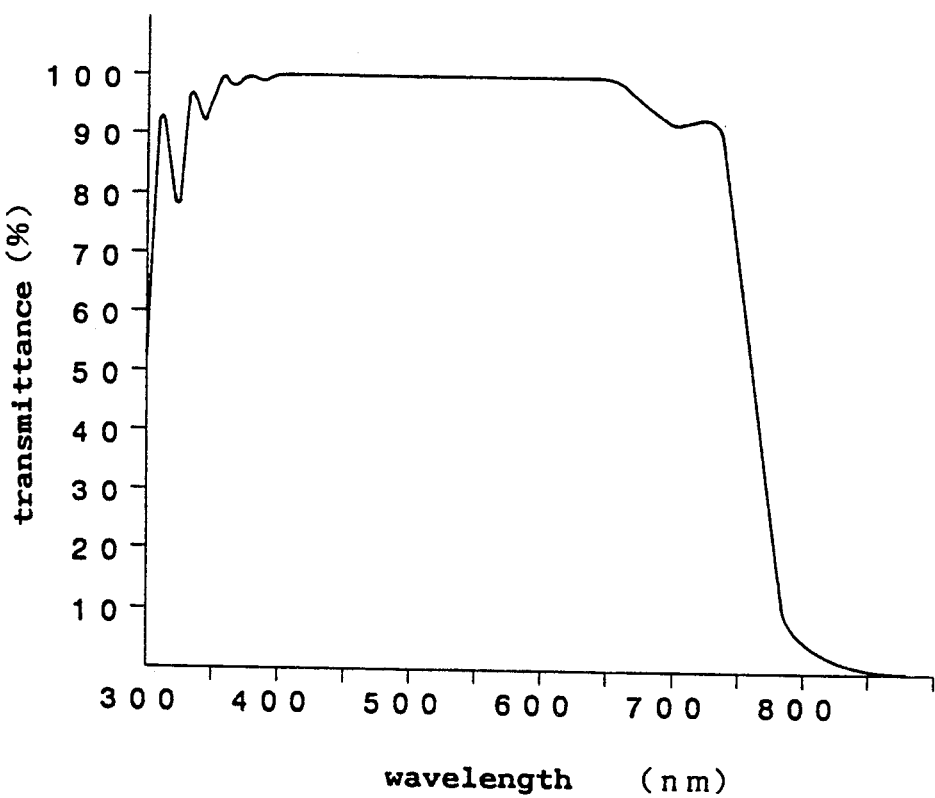
FIG. 4 is a graph showing the relationship between the wavelength of the illuminating light and the transmittance of the light reflecting layer.

Here, it should be noted that the hologram forming layer 10a is a transparent layer. As shown in Table 1, the light reflecting layer 10b is formed by alternately laminating layers of sodium hexafluoro-aluminate ($Na_3AlF_6$) having a relatively small index of refraction and layers of zinc sulphate (ZnS) having a relatively large index of refraction, and, as shown in FIG. 4, has a transmittance of approximately 100% in the range of visible light (380 nm to 700 nm in wavelength) and a transmittance of approximately 0% in the range of infrared light (780 nm or longer in wavelength).

TABLE 1

| Layer Number | material | thickness (nm) |
|---|---|---|
| 1 | $Na_3AlF_6$ | 80 |
| 2 | ZnS | 92 |
| 3 | $Na_3AlF_6$ | 156 |
| 4 | ZnS | 87 |
| 5 | $Na_3AlF_6$ | 149 |
| 6 | ZnS | 84 |
| 7 | $Na_3AlF_6$ | 143 |
| 8 | ZnS | 80 |
| 9 | $Na_3AlF_6$ | 140 |
| 10 | ZnS | 80 |
| 11 | $Na_3AlF_6$ | 143 |
| 12 | ZnS | 84 |
| 13 | $Na_3AlF_6$ | 149 |
| 14 | ZnS | 87 |
| 15 | $Na_3AlF_6$ | 156 |
| 16 | ZnS | 92 |
| 17 | $Na_3AlF_6$ | 80 |

Therefore, this hologram layer 10 is substantially invisible to human eyes, but has such a reflective directivity as to diffract and reflect infrared light projected from a direction opposing the identification label onto a diagonally opposed pair of the sectors 8a through 8h surrounding the light emitting device 6 as illustrated in FIG. 2.

When actually identifying the authenticity of the card 1, the card 1 is conveyed to a position where the light emitting device 6 of the light emitting/receiving unit 5 directly opposes the identification label 3. Then, the illuminating light consisting of infrared light is projected upon the identification label 3. The light diffracted and reflected by the identification label 3 is received by some of the sectors 8a through 8h of the light receiving device 8, and the authenticity of the card 1 is determined according to the pattern of the received light. Therefore, even when a forger obtained this card 1 with a fraudulent intent, since the identification label 3 is not visible to the human eyes and is therefore hard to locate, it would be substantially impossible to forge the card, combined with the difficulty in analyzing the reflective directivity of the hologram and the technical difficulties and the prohibitive cost involved in duplicating the hologram.

Obviously, the present invention is not limited to the above embodiment. For instance, the hologram was designed so that the illuminating light may be diffracted and reflected onto a pair selected from the sectors 8a through 8h of the light receiving device 8, but the hologram may also be designed so that the illuminating light may be diffracted and reflected onto four or more of the sectors 8a through 8h. If desired, it is possible to encode specific data or information in the pattern of the diffracted or reflected light, and to use the identification label as a medium for carrying specific information.

Also, in the above embodiment, the identification label 3 was provided on a magnetic card 1 given as an example of information storage card, but it may be provided on valuable papers such as checks, promissory notes and gift certificates, and commercially sold goods in general. In this case, by covering the card 1 with a mask having an opening at a position corresponding to the location of the identification label 3, it is possible to identify the identification label 3 by using a portable hand scanner or the like.

Although the hologram was used in the above embodiment, similar results can be obtained by using diffraction grating on the identification label 3 which is to be affixed onto the card 1.

As described above, according to the optical identification label for identifying an object of the present invention, since the object carries a light reflecting part including a light reflecting layer which transmits visible light but reflects light other than visible light of a prescribed range of wavelength and is provided with a unique reflective directivity that can be identified with optical identification means, and the visible light is therefore not reflected by the reflective layer or, in other words, the reflective layer is made transparent, the identification label would not affect the design of the object, and the freedom in designing the object is increased. Further, since the location of the identification label cannot be easily determined with human eyes, the forgery of the object is made extremely difficult. Thus, the present invention offers a significant advantage.

Although the present invention has been described in terms of a preferred embodiment thereof, it is obvious to a person skilled in the art that various alterations and modifications are possible without departing from the scope of the present invention which is set forth in the appended claims.

What is claimed is:

1. A transparent optical identification label, comprising a reflective layer which transmits visible light but reflects light of a certain wavelength other than visible light with a specific directivity that can be identified with optical identifying means.

2. A transparent optical identification label according to claim 1, wherein said reflective directivity is given by hologram.

3. A transparent optical identification label according to claim 1, wherein said reflective directivity is given by diffraction grating.

4. A transparent optical identification label according to claim 1, wherein said reflective layer consists of alternating layers of at least two kinds of different materials having different refractive indices.

5. A transparent optical identification label according to claim 1, wherein said identification label is affixed to an object as means for preventing an unauthorized duplication of said object.

6. A transparent optical identification label according to claim 1, wherein data is encoded in a geometrical pattern of said reflected light.

* * * * *